Patented Feb. 13, 1951

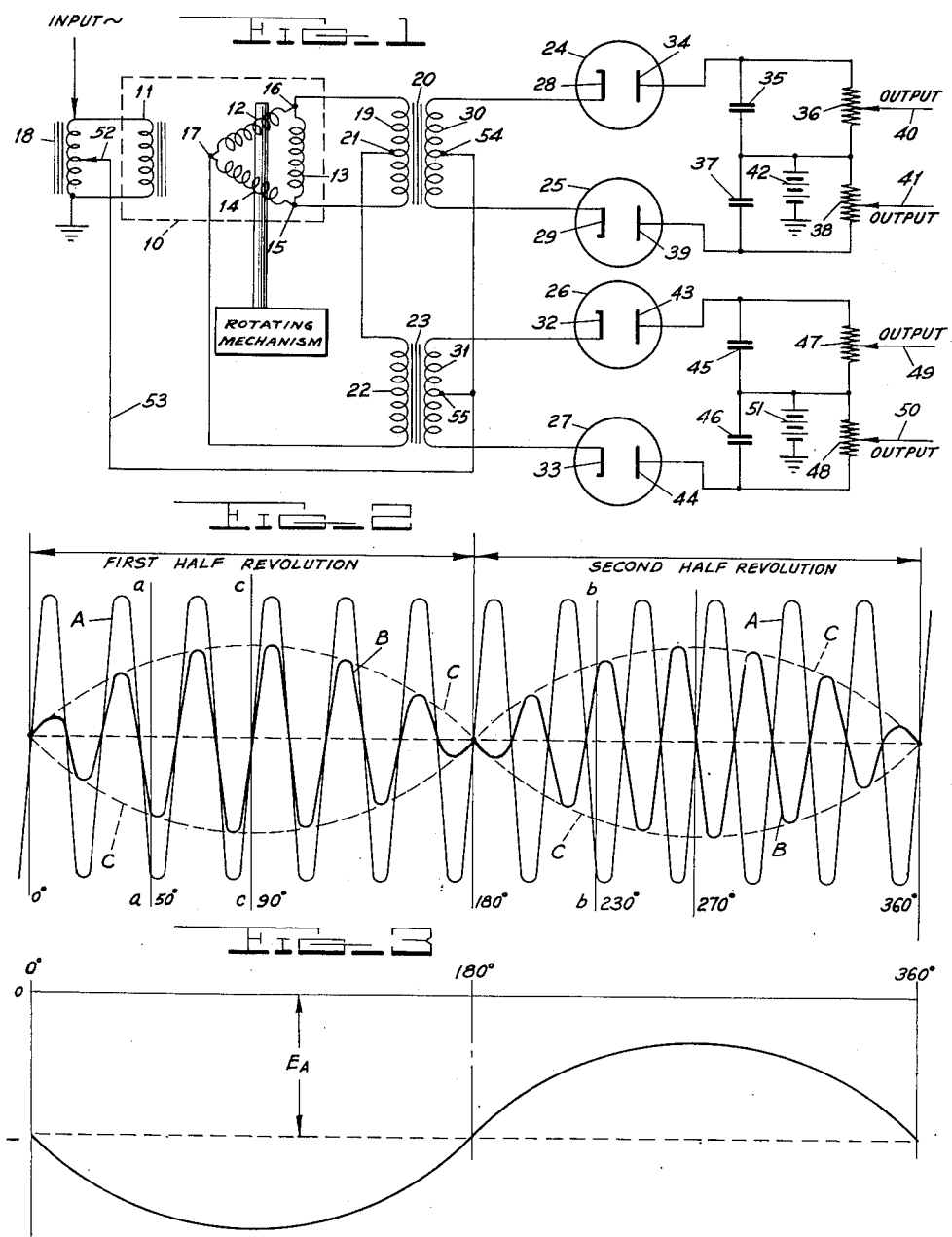

2,541,093

UNITED STATES PATENT OFFICE 2,541,093

VOLTAGE CONVERTER SYSTEM

Robert M. Page, Washington, D. C.

Application November 20, 1942, Serial No. 466,290

11 Claims. (Cl. 321—8)

(Granted under the act of March 3, 1883, as amended April 30, 1928; 370 O. G. 757)

This invention relates to voltage generators and more particularly to methods of and means for generating voltages having characteristics determined by the angular position of a rotatable member.

The principal object of the present invention is to provide a novel method for generating a direct current voltage having a sinuosoidally varying amplitude.

Another object is to provide a novel apparatus for generating a direct current voltage having a sinusoidally varying amplitude.

Another object is to provide novel means for producing a constant direct current voltage having an amplitude determined by the angular position of a rotatable member.

Another object is to provide a novel apparatus for generating a sinusoidally varying direct current voltage at a frequency determined by the speed of rotation of a rotating member.

Another object is to provide a novel apparatus for generating a direct current voltage having a sinusoidally varying amplitude, with the amplitude varying through a complete cycle upon each complete revolution of a rotatable member.

Another object is to provide a novel apparatus for producing a constant direct current voltage having an amplitude determined by the angular position of a rotatable member including means for sinusoidally varying the amplitude of the direct current voltage upon rotation of the member.

Still another object of the invention is to provide novel means for producing a pair of direct current voltages having sinusoidally varying amplitudes 180° out of phase with respect to each other.

Still another object is to provide an apparatus having foregoing characteristics with novel means for producing a second pair of direct current voltage outputs having sinusoidally varying amplitudes 180° out of phase with respect to each other, with the amplitudes of the second pair sinusoidally varying in quadrature with respect to the first pair of direct current voltages.

Other objects and features of the invention will become apparent hereinafter from the following detailed description when considered in connection with the accompanying drawing which illustrate one embodiment of the invention. It is to be expressly understood, however, that the drawing is designed for purposes of illustration only and not as a definition of the limits of the invention, reference for the latter purpose being had to the appended claims.

In the drawing, Fig. 1 is a diagrammatic showing of a voltage generator embodying the principles of the present invention;

Fig. 2 is a schematic showing of the alternating current voltages simultaneously applied to the cathode of one of the rectifier tubes shown in Fig. 1 during operation of the generator disclosed in the latter figure, and Fig. 3 is a schematic showing of one of the voltage outputs of the generator disclosed in Fig. 1.

With reference more particularly to Fig. 1 of the drawing, the voltage generator disclosed therein comprises variable coupling transformer 10 which includes stationary coil 11 and inductances 12, 13 and 14, joined together at points 15, 16 and 17 to form a delta connection, and rotatably mounted with respect to stationary coil 11. It is to be expressly understood that variable coupling transformer 10 may include only a pair of inductances rotatably mounted with respect to each other, and, if desired, coil 11 of the transformer disclosed may be rotatably mounted with respect to inductances 12, 13 and 14; however, for the purpose of clarity, hereinafter coil 11 is considered stationary and inductances 12, 13 and 14 rotatably mounted with respect to the coil. An alternating current input, at audio or power frequencies for example, is applied to coil 11 through transformer 18, the input being applied across the winding of transformer 18. Points 15 and 16 of delta connected inductances are connected to the end terminals of primary winding 19 of transformer 20, while point 17, and mid-point 21 of primary winding 19, are connected to the end terminals of primary winding 22 of transformer 23. With the foregoing connections, voltages having amplitudes determined by the relative position of inductances 12, 13 and 14, with respect to coil 11, are applied to the primary windings of transformers 20 and 23. Since the connections from inductances 12, 13 and 14 to transformer 23 are at right angles to corresponding connections to transformer 20, the phase of the voltages applied to transformers 20 and 23 are in quadrature.

The voltage generator further includes rectifiers, such as diode vacuum tubes 24, 25, 26 and 27, each having a cathode and an anode. The cathodes 28 and 29, of tubes 24 and 25, respectively, are connected to opposite end terminals of secondary winding 30 of transformer 20, while the end terminals of secondary winding 31, of transformer 23, are connected to cathodes 32 and 33 of tubes 26 and 27, respectively. The anodes of each of the rectifier tubes are connected to ground through a condenser which is charged to a value determined by the current flow through the associated rectifier tubes, while each of the condensers is shunted by a resistance to which the output terminals of the generator are connected. As shown, anode 34 of tube 24 is connected to ground through condenser 35 with resistance 36 connected between the anode and ground in parallel with the condenser, while condenser 37 and resistance 38 are connected between anode 39, of tube 25, in a similar manner. Output terminals 40 and 41 are respectively associated with resistances 36 and 38. If desired, battery 42 may be connected between condensers 35, 37 and ground if it is desired to add a constant potential at output terminals 40 and 41, independent of operation of the generator. Anodes 43 and 44, of tubes 26 and 27 respectively, are connected to ground through condensers 45, 46 and resistances 47, 48 in a manner similar to the connections between anodes 34, 39 and ground. Output terminals 49 and 50 are respectively associated with resistances 47 and 48, while battery 51 is shown in series between condenser 45, 46 and ground for a purpose corresponding to the purpose of battery 42.

For a purpose that will appear more fully hereinafter, means are provided for supplying a constant alternating current voltage to the cathodes of rectifier tubes 24, 25, 26 and 27, in addition to the voltages of varying amplitudes applied to the cathodes from inductances 12, 13 and 14, through transformers 20 and 23. As shown, the foregoing means comprises a variable contact 52 associated with the winding of transformer 18, which is electrically connected, by way of conductor 53, to mid-points 54 and 55 of secondary windings 30 and 31. Since the voltage from transformer 18 is applied to mid-points 54 and 55, the voltages appearing at the end terminals of secondary windings 30 and 31, and consequently the voltages applied to the cathodes of the rectifier tubes, by way of conductor 53, are in phase and of equal amplitude. Such constant alternating current voltage may be set to any desired amplitude by varying the position of contact 52.

Whenever an alternating current voltage is applied to transformer 18 a pair of alternating current voltages is applied to the cathodes of rectifier tubes 24, 25, 26 and 27. One of the voltages mentioned above is a constant alternating current voltage, at an amplitude determined by the position of variable contact 52, that is applied in the same phase to each of the cathodes by way of conductor 53, mid-points 54, 55 and secondary windings 30 and 31. This voltage is shown by curve A in Fig. 2. The other voltage is applied to the cathodes from inductances 12, 13 and 14, by way of transformers 20 and 23, and comprises an alternating current voltage, the amplitude and phase of which is determined by the angular position of inductances 12, 13 and 14 with respect to coil 11. More particularly, assuming that inductances 12, 13 and 14 are rotating at a constant speed, during one-half a revolution of the inductances, hereinafter referred to as the first half-revolution of a complete revolution, alternating currents are applied to primary winding 19, of transformer 20, and thus to cathodes 28 and 29, the amplitude of which varies sinusoidally from a point of zero amplitude at the beginning of the first half-revolution, through a point of maximum amplitude as inductances 12, 13 and 14 rotate 90°, and to zero amplitude at the completion of the half-revolution. Such alternating current voltages having sinusoidally varying amplitudes remain at constant phase throughout the first half-revolution of the inductances with the alternating current voltages applied to one of the cathodes being 180° out of phase with respect to the alternating current voltages applied to the other cathode, and, as will appear more fully hereinafter, the alternating current voltage applied to one of the cathodes is therefore in phase with the constant alternating current voltage A, while the alternating current voltage applied to the other cathode is necessarily 180° out of phase with the constant alternating current voltage. During the second half-revolution of inductances 12, 13 and 14 the amplitude of the alternating current voltage applied to cathodes 28 and 29 varies sinusoidally in a manner similar to the sinusoidal varying amplitudes of the alternating current voltages applied during the first half-revolution. The alternating current voltages applied to cathodes 28 and 29 during the second half-revolution are 180° out of phase, as during the first half-revolution, and such voltages are also 180° out of phase with respect to the alternating current voltages applied to corresponding cathodes during the first half-revolution. Therefore, during one-half revolution of a complete revolution of the inductances the alternating current voltages having sinusoidally varying amplitudes are applied to the cathodes in phase with the constant alternating current voltages, while during the next half-revolution such alternating current voltages are applied to the cathodes 180° out of phase with respect to the constant alternating current voltages.

The foregoing may be more readily understood with further reference to Fig. 2 wherein the alternating current voltage having a sinusoidally varying amplitude, applied to cathode 28, for example, for one complete revolution of inductances 12, 13 and 14, is shown simultaneously with the constant alternating current voltage A supplied to the cathode by way of conductor 53. More particularly, as shown in the figure, curve B represents the alternating current voltage having a sinusoidal varying amplitude, while curves C show the sinusoidal envelopes developed by the sinusoidally varying amplitude of voltage B for a complete revolution of inductances 12, 13 and 14. It is to be expressly understood that the amplitude of voltage B sinusoidally varies from zero amplitude at the beginning of a complete revolution of inductances 12, 13 and 14, through maximum amplitude when the inductances rotate 90°, and to zero amplitude after 180° of rotation, or, upon completion of the first half-revolution, and, the amplitude sinusoidally varies in a similar manner during the next 180° of rotation, the second half-revolution. Also, the voltage curves of Fig. 2 show the alternating current voltage B in phase with the constant alternating current voltage A during the first half-revolution, and 180° out of phase during the second half-revolution. The alternating current voltages A and B simultaneously applied to cathode 29 are similar to the curves shown in Fig. 2 in that the amplitude of voltage curve B sinusoidally varies to develop sinusoidal envelope upon a complete revolution of inductances 12, 13 and 14; however, during the first half-revolution the alternating current voltage B is 180° out of phase with the constant alternating current voltage A, and in phase during the second half-revolution. It is to be expressly understood that at any position of inductances 12, 13 and 14, during a complete revolution thereof, an alternating current voltage, having an amplitude corresponding to the amplitude of sinusoidal envelope C, is applied 180° out of phase to cathodes 28 and 29. For example, with reference to Fig. 2, when the inductances rotate 50° from the zero degree position thereof, the amplitude of the alternating current voltage applied to the cathodes is equal to the amplitude of the sinusoidal envelope at line a—a, while the amplitude of the alternating current voltage is equal to the amplitude of the sinusoidal envelope at line b—b when the inductances rotate 230° from the zero degree position shown.

As mentioned heretofore, whenever an alternating current voltage is applied to transformer 18 alternating current voltages, having varying amplitudes and phases determined by the relative angular position of inductances 12, 13 and 14 with respect to coil 11, are also supplied to cathodes 32 and 33 simultaneously with the constant alternating current voltage applied thereto by way of electrical conductor 53. Such voltages have sinusoidally varying amplitudes, developing a complete sinusoidal envelope upon each complete revolution of the inductances, similar to envelope C, as shown in Fig. 2. Also, such alternating current voltages are applied to cathodes 32, 33 in phase with the constant alternating current voltages during one half-revolution of the inductances and 180° out of phase during the other half-revolution with the voltages applied to one of the cathodes at all times being 180° out of phase with respect to the voltages applied to the other cathode. However, since the alternating current voltages from inductances 12, 13 and 14 are applied to transformer 23 in quadrature with respect to application of such voltages to transformer 20, the alternating current voltages having sinusoidally varying amplitudes applied to cathodes 32 and 33 sinusoidally vary in amplitude 90° out of phase with respect to the alternating current voltages having sinusoidally varying amplitudes that are supplied to cathodes 28 and 29.

Simultaneous application of the constant alternating current voltage A and alternating current voltage B to cathode 28 operates rectifier tube 24 in such a manner that a rectified voltage, having a sinusoidally varying amplitude, varying through a complete sinusoidal cycle upon each complete revolution of inductances 12, 13 and 14, appears across condenser 35 and resistance 36, as shown in Fig. 3. As mentioned heretofore, and as shown in Fig. 2, during the first half-revolution of the inductances, voltages A and B are applied in phase to cathode 28. Therefore, during such half-revolution a rectified voltage appears across condenser 35 and resistances 36 that is proportional to the sum of alternating current voltages A and B. Since the amplitude of alternating current voltage B sinusoidally varies from zero amplitude, through maximum amplitude, again to zero amplitude, the sum of the amplitudes of voltages A and B, and consequently the amplitude of the rectified voltage appearing across condenser 35 and resistance 36, varies in a corresponding manner. The amplitude of the rectified voltage varies with respect to an average rectified voltage $E_A$, appearing across the condenser 35 and resistance 36, that is proportional to the amplitude of the constant alternating current voltage A, plus the voltage from battery 42 when employed. During the second half-revolution, alternating current voltages A and B are applied 180° out of phase to cathode 28 and a rectified voltage appears across condenser 35 and resistance 36 that is proportional to difference between the amplitude of such voltages. Since the resultant voltage applied to cathode 28 during the second half-revolution varies 180° out of phase with respect to the resultant voltage applied thereto during the first half-revolution, the amplitude of the rectified voltage appearing across the condenser and the resistance during the second half-revolution sinusoidally varies 180° out of phase with respect to the rectified sinusoidally varying voltage applied during the first half-revolution. In view of the fact that the rectified voltage on condenser 35 swings below the average voltage $E_A$, the value of the amplitude of voltage A is set to be equal to or greater than the maximum amplitude of alternating current voltage B in order to maintain continuous operation of tube 24 and thus at all times provide an output voltage, of a certain amplitude corresponding to a certain position of inductances 12, 13 and 14 with respect to coil 11. Since the aforementioned voltages applied to cathode 29 are similar to voltages A and B applied to cathode 28, with the exception that the sinusoidally varying voltages are 180° out of phase, tube 26 operates in such a manner that a rectified voltage appears across condenser 37 and resistance 38 having an amplitude that sinusoidally varies 180° out of phase with respect to the amplitude of the voltage across condenser 35. Furthermore, since the voltages applied to cathodes 32 and 33 are similar to the voltages applied to cathodes 28 and 29, respectively, with a 90° phase difference between the sinusoidal varying amplitudes, tubes 26 and 27 operate in a manner similar to the aforementioned operation of tubes 24 and 25, but lag operation of the latter tubes by 90° or a quarter of a revolution of the inductances. The rectified voltages appearing across condensers 45, 46 and across resistances 47, 48 have sinusoidally varying amplitudes, following a sinusoidal cycle upon each complete revolution of the inductances, varying 180° out of phase with respect to each other and 90° out of phase with respect to the sinusoidally varying amplitudes of the rectified voltages appearing across condensers 35 and 37. The foregoing voltages appearing across condensers 35, 37, 45 and 46 are fed to any desired point by way of output terminals 40, 41, 49 and 50.

Whenever inductances 12, 13 and 14 are stationary with respect to coil 11, with an alternating current input applied to transformer 18, constant rectified voltages are maintained at output terminals 40, 41, 49 and 50 having amplitudes corresponding to the angular position of the inductances with respect to coil 11. Since the sinusoidally varying amplitudes of the alternating current voltages applied to cathodes 24, 25, 26 and 27 develop a complete sinusoidal envelope upon each revolution of the inductances through 360°, as shown in Fig. 2, alternating currents having constant amplitudes are applied to the cathodes when the inductances stop rotating, with the amplitudes being equal to the amplitude of the sinusoidal envelopes for the stationary position of the inductances. For example, assuming that inductances 12, 13 and 14 occupy a stationary position with respect to coil 11 as shown in Fig. 1, alternating current voltages of constant maximum amplitude are applied 180° out of phase to cathodes 28 and 29. Such amplitudes are equal to the amplitude of the sinusoidal envelope at line c—c, as shown in Fig. 2. Since transformer 23 is connected to inductances 12, 13 and 14 at right angles to coil 11, for the assumed stationary position of the inductances no voltages are applied to cathodes 32 and 33. The latter is more fully understood with reference to Fig. 2 wherein line 0°, which leads line c—c by 90°, passes through a point of zero voltage on curve B. With the foregoing conditions, rectified voltages, of constant amplitude, at maximum and minimum values, are maintained at output terminals 40 and 41, while constant rectified voltage $E_A$, corresponding to the amplitude of the constant alternating current voltage A, is maintained on output terminals 49 and 50. It is to be expressly understood, therefore, that for any stationary position of inductances 12, 13 and 14, rectified voltages, having constant amplitudes corresponding to the relative angular position of the inductances with respect to coil 11 are maintained at the output terminals. Since the foregoing voltages are in quadrature, the same may be employed for operating devices well known in the art whereby angular positions of a rotatable member may be transmitted with a high degree of accuracy.

There is thus provided by the present invention a novel method and means for generating a direct current voltage having a sinusoidally varying amplitude. The novel apparatus provided by the present invention produces a plurality of direct current voltage outputs having sinusoidally varying amplitudes, in definite phase relations, at a frequency determined by the rotating speed of a rotatable member, and with the apparatus so characterized to produce a plurality of direct current voltages at constant amplitudes whenever such rotatable member is stationary, with such amplitudes determined by the angular position of the rotatable member.

Although only one embodiment of the invention has been disclosed and described in detail herein, it is to be expressly understood that various changes and substitutions may be made therein without departing from the spirit of the invention as well understood by those skilled in the art. For example, the present invention is not limited to the type of variable coupling transformer disclosed since conventional variometers may be substituted therefor, such as a pair of relatively rotatable inductances. Reference therefore will be had to the appended claims for a definition of the limits of the invention.

The invention described herein may be manufactured and used by or for the Government of the United States of America for governmental purposes without the payment of any royalties thereon or therefor.

What is claimed is:

1. In a voltage generator, stationary inductance means, rotatable inductance means coupled to said stationary inductance means, means applying alternating current voltage to one of said inductance means whereby alternating current voltage is induced in the other inductance means having an amplitude and phase determined by the relative angular positions of said inductance means, a source of constant alternating current voltage, a combining circuit fed by the output of said other inductance and said source of constant amplitude alternating voltage to produce a resultant voltage, and rectifying means fed by said resultant voltage.

2. In a generator for producing a direct current voltage having an amplitude determined by the angular position of a rotatable member, an inductance mounted on said member, another inductance coupled to said inductance, means applying alternating current voltage to one of said inductances whereby alternating current voltages are induced in the other inductance, a source of constant amplitude alternating voltage, a combining circuit fed by the output of said other inductance and said source of constant amplitude alternating voltage to produce a resultant voltage, and rectifying means fed by said resultant voltage.

3. A generator for producing a direct current voltage having a sinusoidally varying amplitude comprising a pair of coupled inductances mounted for relative angular movement with respect to each other, means applying alternating current voltage to one of said inductance means whereby alternating current voltages are induced in the other inductance means, a source of constant amplitude alternating voltage, a combined circuit fed by the output of said other inductance and said source of constant amplitude alternating voltage to produce a resultant voltage, and rectifying means fed by said resultant voltage.

4. In a voltage generator, stationary inductance means, delta connected inductance means coupled to said stationary inductance means and rotatably mounted with respect to the latter, means applying alternating current voltage to said stationary inductance means whereby alternating current voltages are induced in said delta connected inductance means, a pair of transformers each having primary and secondary windings, means connecting said delta connected inductance means to each of said primary windings in quadrature with respect to the other primary winding, means applying constant alternating current voltage to each of said secondary windings, and means rectifying the resultant alternating current voltages induced in said secondary windings.

5. The method of generating a direct current voltage having an amplitude determined by the angular position of a rotatable member which comprises, varying the amplitude of a first alternating current voltage according to the angular position of a rotatable member, combining said first alternating current voltage with a second alternating current voltage of constant amplitude, and rectifying the voltage signal resulting from said combination.

6. The method of generating a direct current voltage having a sinusoidally varying amplitude determined by the angular position of a rotatable member, which comprises, cyclically varying the amplitude of a first alternating current voltage in response to rotation by said rotatable member, alternately reversing the phase of said alternating current voltage between successive cyclic amplitude variations thereof, combining said alternating current voltage of cyclic variations in amplitude with a second alternating current voltage of constant amplitude and phase, and rectifying the voltage signal resulting from said combination.

7. A voltage generator comprising, a pair of coupled inductance means mounted for relative movement with respect to each other, a source of alternating current voltage, said source of alternating current applied to one of said inductance means whereby currents of an amplitude determined by the relative angular positions of said pair of inductance means are induced in the other inductance means, means combining said induced alternating current voltage with a constant amplitude component of said alternating current source to produce a resultant voltage wave, and means rectifying said resultant voltage wave.

8. A voltage generator comprising, a pair of coupled inductance means mounted for relative angular movement, a source of alternating current voltage, said source of alternating current voltage applied to one of said pair of inductance means whereby currents of an amplitude and phase determined by the relative angular position of said pair of inductance means are induced in the other of said inductance means, transformer means combining said induced alternating current voltage with a constant amplitude component of said alternating current source to produce a resultant voltage wave, means rectifying said resultant voltage wave so as to produce a direct current output having a sinusoidally varying amplitude with the amplitude varying through a complete sinusoidal cycle when said pair of inductance means are relatively rotated throughout 360°.

9. A voltage generator comprising, a pair of coupled inductance means mounted for relative angular movement, a source of alternating current voltage, said source of alternating current voltage applied to one of said pair of inductance means whereby currents of an amplitude and phase determined by the relative angular position of said pair of inductance means are induced in the other of said inductance means, means splitting said induced currents so as to produce a pair of phase opposed induced voltage waves, means combining said pair of phase opposed induced voltage waves with a constant amplitude component of said alternating current source so as to produce a pair of resultant voltage waves, and means rectifying each of said resultant voltage waves.

10. A voltage generator comprising a pair of coupled inductance means, means applying an alternating current to one of said inductance means whereby a pair of currents whose amplitudes vary in phase quadrature relation are induced in the other of said inductance means with relative rotation of said inductance means, means producing relative rotational movement between said inductance means thereby varying the amplitude of said induced currents, a source of constant amplitude alternating current, means combining said induced currents with said constant amplitude alternating current source to produce a pair of resultant voltage waves, and means rectifying each of said last named resultant voltage waves so as to produce two pairs of sinusoidally varying direct current voltages with one pair 90° out of phase with the other pair and with the amplitude of each direct current voltage component varying through a complete sinusoidal cycle as said pair of inductance means are relatively rotated throughout 360°.

11. In combination, a source of alternating voltage, amplitude control means including a rotatable member connected to receive said alternating voltage and operative responsive to rotation of said rotatable member to produce a cyclically varying amplitude alternating voltage output, said cyclic varying output voltage having opposed phase characteristics between successive cycles of amplitude variations, means combining said cyclic varying output voltage with a constant amplitude and phase component of said alternating voltage thereby to produce a resultant voltage wave, and means for rectifying said resultant voltage wave.

ROBERT M. PAGE.

REFERENCES CITED

The following references are of record in the file of this patent:

UNITED STATES PATENTS

| Number | Name | Date |
|---|---|---|
| 824,225 | Winkander | June 26, 1906 |
| 1,939,455 | Livingston | Dec. 12, 1933 |
| 1,955,524 | Augier et al. | Apr. 17, 1934 |
| 2,343,116 | Ryder et al. | Feb. 29, 1944 |